United States Patent
Gupta et al.

(10) Patent No.: US 12,541,493 B1
(45) Date of Patent: Feb. 3, 2026

(54) AUTOMATIC VECTOR INDEX GENERATION WITH MACHINE-LEARNED LARGE LANGUAGE MODEL

(71) Applicant: Databricks, Inc., San Francisco, CA (US)

(72) Inventors: Akhil Gupta, Hillsborough, CA (US); Eric Christopher Peter, Greenbrae, CA (US); Zhidong Qu, Milpitas, CA (US); Kevin Raji Cherian, San Ramon, CA (US); Sergei Sergeevich Tsarev, San Francisco, CA (US); Ankit Vij, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/755,593

(22) Filed: Jun. 26, 2024

(51) Int. Cl.
*G06F 16/22* (2019.01)
(52) U.S. Cl.
CPC .................. *G06F 16/2237* (2019.01)
(58) Field of Classification Search
CPC .................. G06F 16/22; G06F 16/2237
See application file for complete search history.

(56) References Cited

U.S. PATENT DOCUMENTS

| | | | |
|---|---|---|---|
| 12,235,882 B1 * | 2/2025 | Chawla | G06F 16/285 |
| 12,265,590 B1 * | 4/2025 | Shiokawa | G06F 40/30 |
| 2014/0047454 A1 | 2/2014 | Oliver | |
| 2020/0175360 A1 | 6/2020 | Conti | |
| 2022/0222235 A1 * | 7/2022 | Menghani | G06F 16/2255 |
| 2023/0171235 A1 * | 6/2023 | Chhibber | H04L 63/1425 726/4 |
| 2024/0378655 A1 * | 11/2024 | Eyal | G06N 5/02 |
| 2025/0086647 A1 | 3/2025 | Gao | |

(Continued)

FOREIGN PATENT DOCUMENTS

CN 116701431 A * 9/2023 ............ G06F 16/243

OTHER PUBLICATIONS

Ispas, A. et al. "Databricks SQL Statement Execution API—Announcing the Public Preview." Databricks Platform Blog, Mar. 7, 2023, 12 pages, [Online] [Retrieved Aug. 27, 2024], Retrieved from the Internet <URL:https://www.databricks.com/blog/2023/03/07/databricks-sql-statement-execution-api-announcing-public-preview.html>.

(Continued)

*Primary Examiner* — Hares Jami
(74) *Attorney, Agent, or Firm* — Fenwick & West LLP

(57) ABSTRACT

A data processing system accesses a dataset from a data source and generates a set of embedding vectors representing the dataset in a latent space. The system splits the dataset into a set of data chunks and generates the embedding vectors. Each embedding vector represents a data chunk. The system may store the generated set of embedding vectors in a vector database that includes a plurality of embedding vectors. The system updates the embedding vectors by detecting a change to a first dataset that is represented by a first set of embedding vectors in the vector database, determining that the change to the first dataset is related to a first data chunk of the first set of data chunks included in the first dataset, updating a first embedding vector representing the first data chunk with the detected change; and storing the updated first embedding vector in the vector database.

20 Claims, 10 Drawing Sheets

(56) References Cited

U.S. PATENT DOCUMENTS

2025/0103746 A1* 3/2025 Gharibi .............. G06F 21/6227

OTHER PUBLICATIONS

OPENSEARCH. "Paginate Results." OpenSearch.org, Nov. 17, 2022, 9 pages, [Online] [Retrieved Aug. 27, 2024], Retrieved from the Internet <URL:https://opensearch.org/docs/latest/search-plugins/searching-data/paginate/>.

United States Office Action, U.S. Appl. No. 18/755,591, filed Jul. 10, 2025, 29 pages.

* cited by examiner

US 12,541,493 B1

AUTOMATIC VECTOR INDEX GENERATION WITH MACHINE-LEARNED LARGE LANGUAGE MODEL

TECHNICAL FIELD

The disclosed configuration relates generally to data processing technologies, and more particularly to retrieval augmented generation with vector search.

BACKGROUND

Artificial intelligence (AI) and machine-learned models designed for data processing can be employed to produce responses across a range of tasks. Despite possessing an extensive and profound knowledge base, Large Language Models (LLMs) excel particularly in responding to general inquiries as they are generally trained for broad applications. This limitation arises from the inherent generality of LLMs and their training on a vast, user-agnostic dataset. LLMs trained on user-agnostic datasets may lack contextual understanding of specific user needs, preferences, or technical nuances. This can lead to generating content that is irrelevant, inappropriate, or inaccurate to specific users. LLMs generate code based on learned patterns during training, which may not consistently align with the specific schema or context of a given database.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
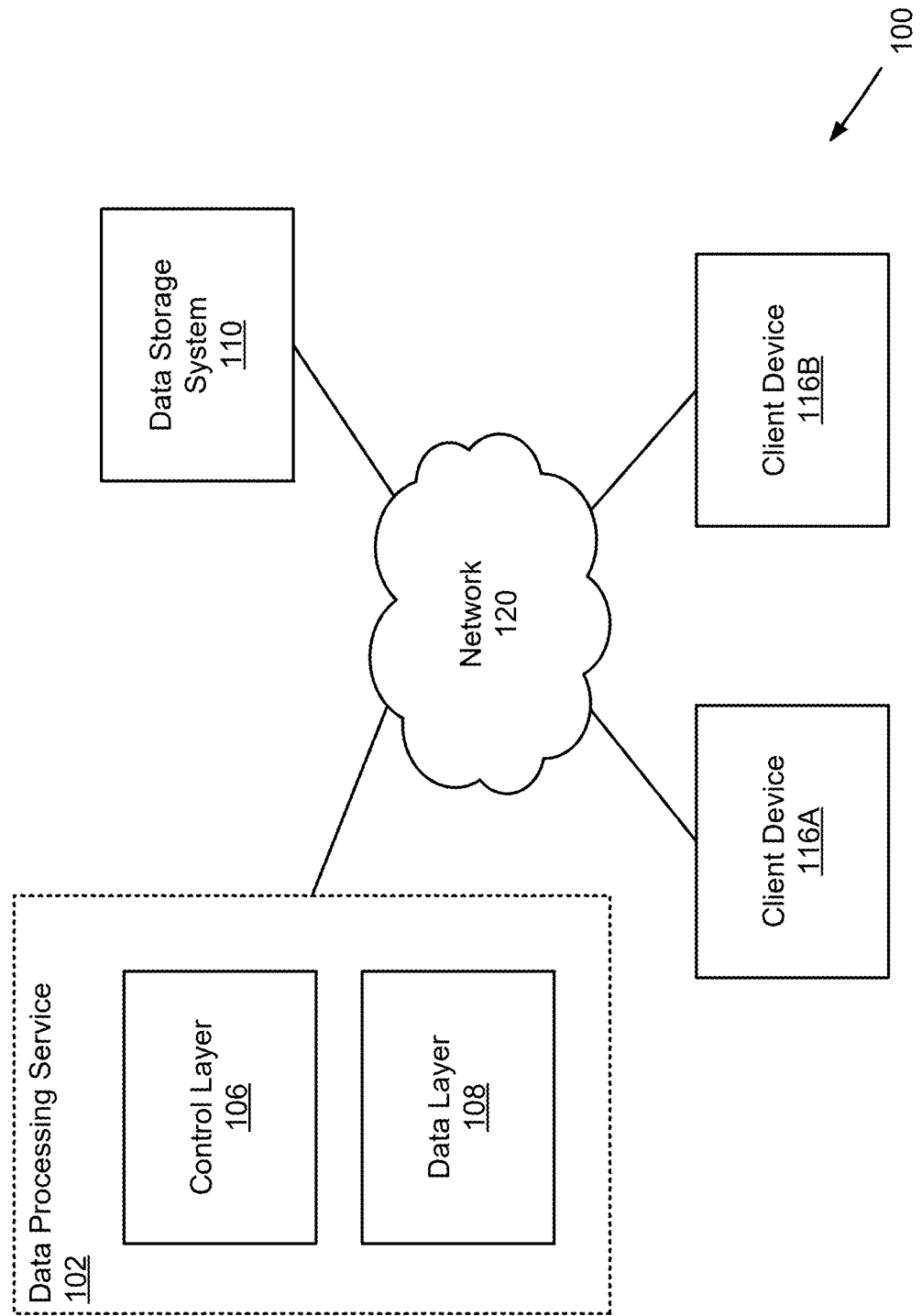
FIG. 1 is a high-level block diagram of a system environment for a data processing service, in accordance with an embodiment.

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

The disclosed configurations provide a method (and/or a computer-readable medium or system) of retrieval augmented generation (RAG) using vector search. The configuration receives a query from a user and accesses a vector database that includes a plurality of embedding vectors. The embedding vectors may represent datasets in a latent space. Each dataset may include a set of data chunks, and each data chunk may be represented by a set of embedding vectors in the latent space. Each embedding vector is incrementally updated based on a change to the corresponding data chunk. The configuration identifies one or more data chunks/datasets using the embedding vectors based on the query. The configuration generates a prompt for input to a machine-learned language model, and the prompt specifies at least the query, the one or more identified datasets, and a request to generate a response to the query using the one or more identified datasets as contextual information of the query. The configuration provides the prompt to a model serving system for execution by the machine-learned language model and receives an output that includes the requested response to the query.

In another aspect, the configuration receives a request from a user. The request specifies a task for generating one or more embedding vectors to represent a target dataset by using a target embedding model. The configuration may use an automatic pipeline to generate the embedding vectors. The automatic pipeline may pre-process the target dataset to generate one or more batches of the target dataset, and each batch of the target dataset may include a plurality of data chunks in the target dataset. The automatic pipeline assigns, based in part on the request, a number of computing resources to each batch of the target dataset; and applies, using the number of computing resources, the target embedding model to each batch of the target dataset to generate the one or more embedding vectors. Each embedding vector represents a data chunk of the target dataset in a latent space and is incrementally updated based on an update to a corresponding data chunk represented by the embedding vector. The configuration stores, in a vector database, the generated one or more embedding vectors for representing the target dataset in the latent space. The automatic pipeline may automatically initiate a number of computing resources for generating embedding vectors for each batch of dataset and monitor the indexing process. For example, when the configuration detects that the indexing process is too slow, the automatic pipeline may automatically adjust the number of computing resources to the batch of target dataset. In this way, the configuration may automatically scale up or down the number of computing resources based on the error characteristics detected during the indexing process.

In another aspect, the configuration presents a query response to the user including the received output. The configuration accesses a dataset from a data source and generates a set of embedding vectors representing the dataset in a latent space. The configuration splits the dataset into a set of data chunks and generates the embedding vectors. Each embedding vector represents a data chunk. The configuration may store the generated set of embedding vectors in a vector database that includes a plurality of embedding vectors. The configuration updates the embedding vectors by detecting a change to a first dataset that is represented by a first set of embedding vectors in the vector database, determining that the change to the first dataset is related to a first data chunk of the first set of data chunks included in the first dataset, updating a first embedding vector representing the first data chunk with the detected change; and storing the updated first embedding vector in the vector database.

RAG with vector search enhances the capabilities of LLMs by providing context-rich external knowledge. Vector search allows LLMs to retrieve relevant external knowledge by using embedding vectors, enriching the context in which the model generates responses. This helps in providing more contextually accurate and informed answers. The embedding vectors act as a source of additional information that LLMs can use to better understand the user's query and/or context. This contributes to more coherent and relevant responses. By leveraging customized data, RAG may better address the user's intent, even when the model's training data may not have covered specific nuances or details. This approach improves the model's understanding, responsiveness, and adaptability, ultimately leading to more accurate and contextually relevant generation of responses.

In some cases, the information encoded within embedding vectors can become outdated for various reasons. One significant factor is the evolution of the information and data, for example, the original dataset is modified, new dataset is added, and the like. Additionally, the emergence of new concepts, entities, and phenomena not present during the original embedding training can result in incomplete or biased representations. To counteract these challenges, periodic updates with new data is vital to ensure the continued accuracy and relevance of embedding vectors across various applications and domains. However, the current methods of updating embedding vectors often require re-encoding or re-generating the whole embedding vector with the entire updated dataset, which causes significant resource constraints. Limited computational resources and memory can hinder the scalability and efficiency of the update process, particularly when dealing with large datasets or complex models. Ensuring that the embedding vectors can efficiently store and process new data without exceeding resource limitations requires careful optimization and management.

This disclosure describes a configuration of updating the embedding vectors incrementally based on the changes to the datasets rather than re-coding the entire updated datasets. In this way, the embedding vectors may be updated without causing resource constraints. The external knowledge represented by vectors may be incrementally updated or expanded to include new information, insights, or developments in a particular domain. LLMs, through RAG, can adapt to these changes by incorporating the latest knowledge into their responses. External knowledge vectors may be dynamically updated in real-time to reflect the most recent information. LLMs may use RAG with vector search, to effectively handle and incorporate changes in information over time. It improves the model's ability to stay relevant and up-to-date by adapting to evolving data, trends, or external knowledge.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 1000 as described with FIG. 10.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data storage system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 1000 as described with FIG. 10.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 102 via the network 120. In another embodiment, the client device 116 interacts with the various systems of the system environment 100 through an application programming interface (API) running on a native operating system of the client device 116, such as IOS® or ANDROID™.

Figure 2:
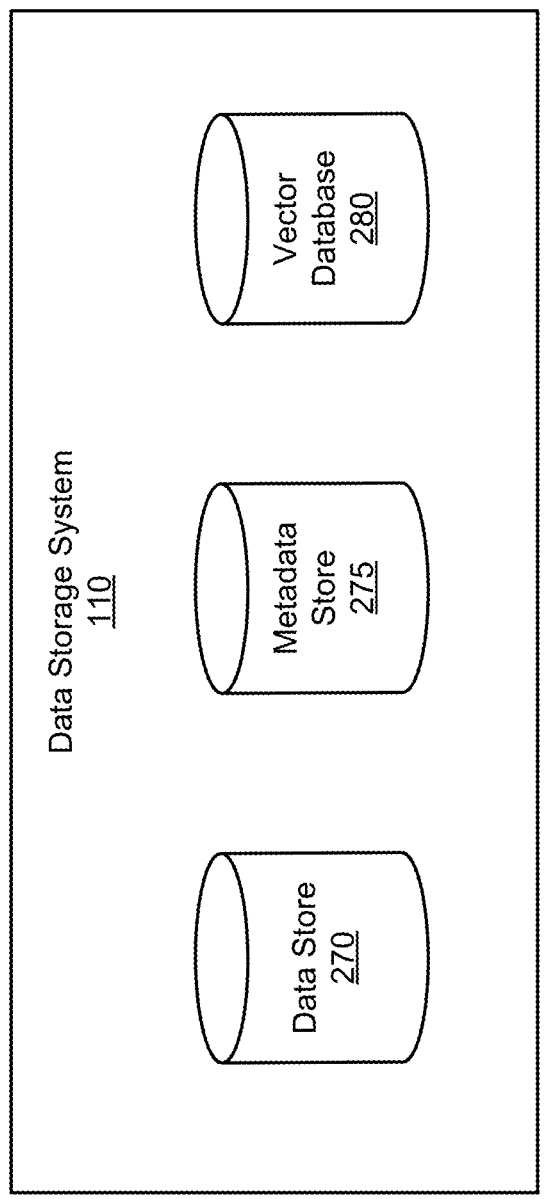
FIG. 2 illustrates a block diagram of an architecture of a data storage system, in accordance with an embodiment.

FIG. 2 is a block diagram of an architecture of a data storage system 110, in accordance with an embodiment. In one embodiment, the data storage system 110 includes a data ingestion module 250. The data storage system 110 also includes a data store 270, a metadata store 275, and a vector database 280.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 110. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

In some embodiments, the metadata store 275 is configured to store metadata associated with embedding vectors and/or the datasets corresponding embedding vectors. For example, the metadata may include information describing a dataset. In one example, the metadata may include parameters included in a dataset, such as, date, ID, address, etc. In another example, the metadata may include a vector index that contains a unique ID, e.g., a primary key, and an array of floats representing an embedding vector. In some implementations, the metadata may be used as context information for performing a user query. In some implementations, the metadata may provide filter parameters to refine a user query.

The vector database 280 is configured to store embedding vectors. Each embedding vector is configured to represent a data chunk/dataset in a latent space. The vector database 280 may be a knowledge base that clusters the embedding vectors based on their similarity. Embedding vectors in the vector database 280 may be used to compare with a user query to provide context information for the user query. In some embodiments, the vector database 280 may be periodically updated based on updates of data chunks/datasets. In some embodiments, the vector database 280 may be incrementally updated based on changes in the corresponding data chunks/datasets.

Figure 3:
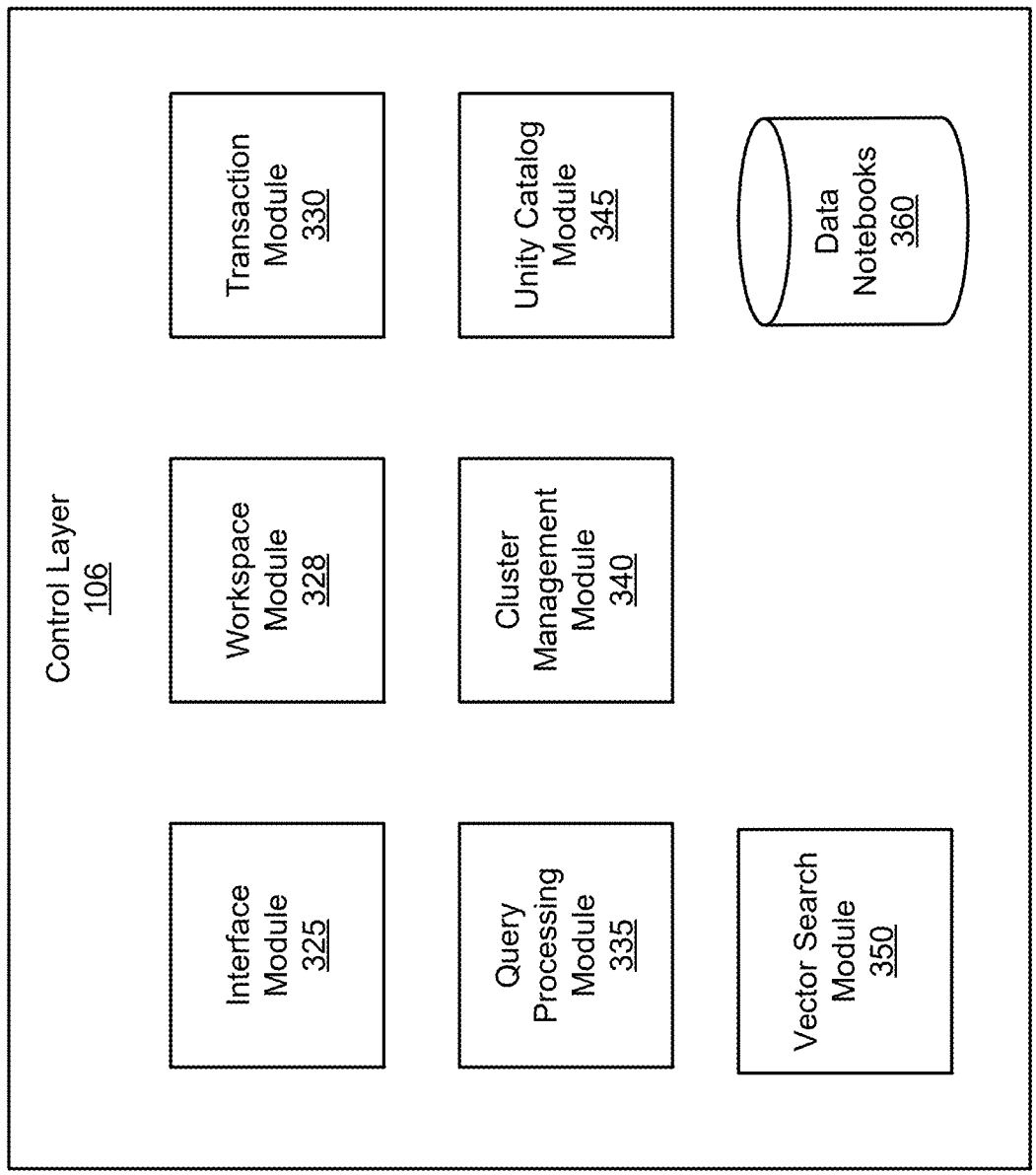
FIG. 3 illustrates a block diagram of an architecture of a control layer, in accordance with an embodiment.

FIG. 3 is a block diagram of an architecture of a control layer 106, in accordance with an embodiment. In one embodiment, the data processing system 102 includes an interface module 325, a transaction module 330, a query processing module 335, and a cluster management module 340. The control layer 106 also includes a data notebook store 360. The modules 325, 330, 335, and 340 may be structured for execution by a computer system, e.g., 1000 having some or all of the components as described in FIG. 10, such that the computer system 1000 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 328.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108 and receives responses to the queries from clusters in which the queries are executed.

The unity catalog module 345 is a fine-grained governance solution for managing assets within the data processing service 102. It helps simplify security and governance by providing a central place to administer and audit data access. In one embodiment, the unity catalog module 345 maintains a metastore for a respective account. A metastore is a top-level container of objects for the account. The metastore may store data objects and the permissions that govern access to the objects. A metastore for an account can be assigned to one or more workspaces associated with the account. In one embodiment, the unity catalog module 345 organizes data as a three-level namespace, a catalogue is the first layer, a schema (also called a database) is the second layer, and tables and views are the third layer.

In one embodiment, the unity catalog module 345 enables read and write of data to data stored in cloud storage of the data storage system 110 on behalf of users associated with an account and/or workspace. In one instance, the unity catalog module 345 manages storage credentials and external locations. A storage credential represents an authentication and authorization mechanism for accessing data stored on the data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in the unity catalog module 345, the unity catalog module 345 does not attempt to authenticate to the data storage system 110.

In one embodiment, the unity catalog module 345 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), the unity catalog module 345 creates a share in the metastore of the provider. A share is a securable object registered in the metastore for a provider. A share contains tables and notebook files from the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. The unity catalog module 345 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore.

The vector search module 350 may be configured to generate an embedding vector representing data in a latent space. In some embodiments, the vector search module 350 may split the received data into a plurality of data chunks and each data chunk may include a portion of the received data. For example, one data chunk may be a paragraph of text in a text document, another data chunk may be a row of data in a data table, etc. The vector search module 350 may apply a machine learning model to a data chunk to generate an embedding vector for representing the data chunk in the latent space. In some embodiments, an embedding vector may be incrementally updated based on any update to the corresponding data chunk. The vector search module 350 maps the generated embedding vectors into the latent space. The distance of two embedding vectors in the latent space may indicate the similarity of the corresponding data chunks. In some embodiments, the generated embedding vector may be stored in the vector database 280.

In some embodiments, when receiving a query from a user, the vector search module 350 may generate a user query embedding vector that represents the user query in the latent space. The vector search module 350 may apply the same machine learning model to the user query and output the corresponding user query embedding vector. In some embodiments, based on the generated user query embedding vector, the vector search module 350 may access the vector database 280 and identify one or more embedding vectors stored in the vector database 280. The data ingestion module 250 may identify the stored embedding vectors based on their similarities with the user query embedding vector. Using the identified embedding vectors, the vector search module 350 may determine the data chunks represented by the identified embedding vectors. The vector search module 350 may use the determined data chunks as context information/knowledge for performing a retrieval augmented generation. For example, the vector search module 350 may input the user query with the determined data chunks to a large language model (LLM) and receive a response to the user query.

Figure 4:
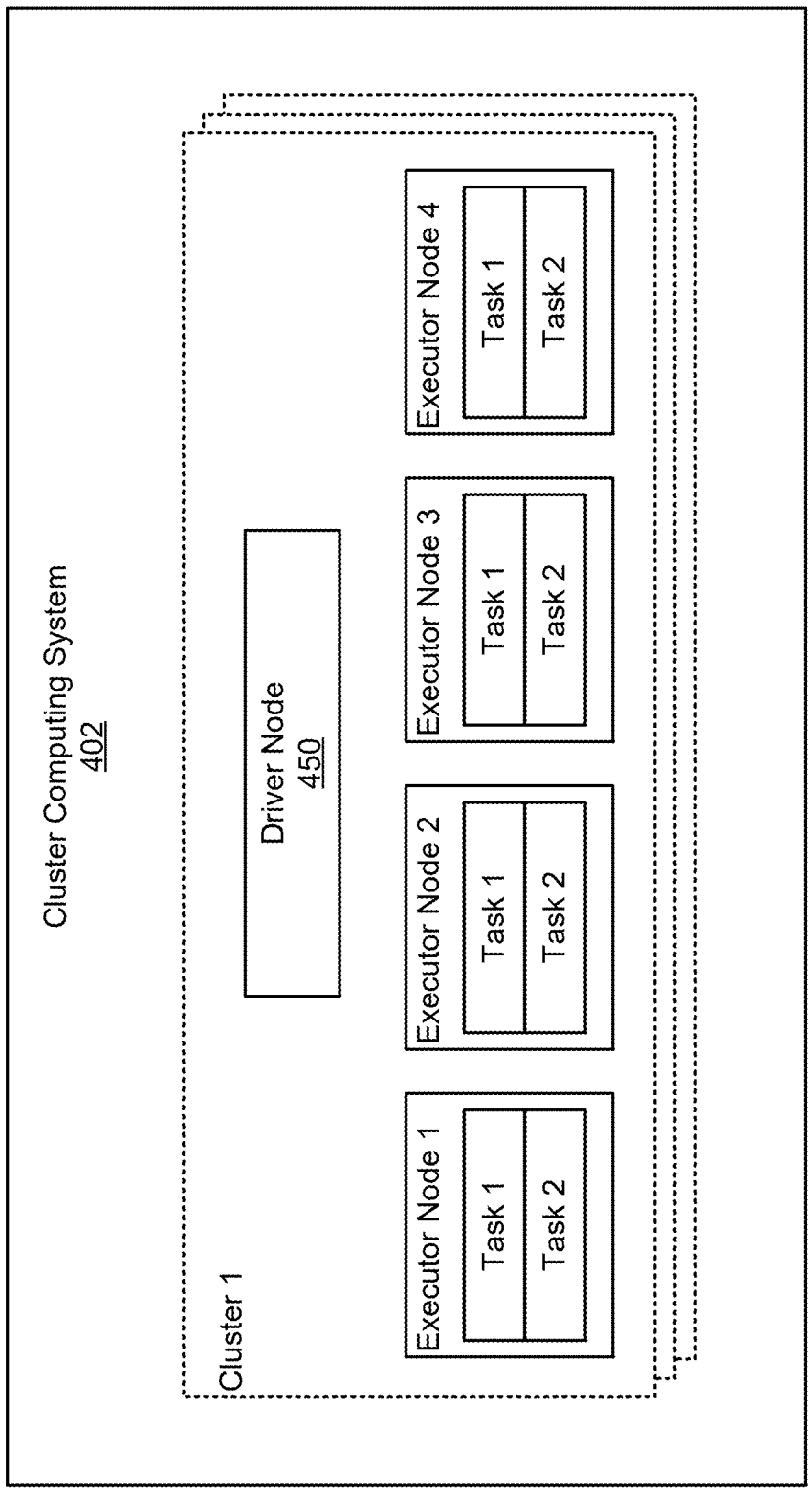
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes. The nodes may be structured for execution by a computer system, e.g., 1000 having some or all of the components as described in FIG. 10, such that the computer system 1000 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

Retrieval Augmented Generation Using Embedding Vectors

Figure 5:
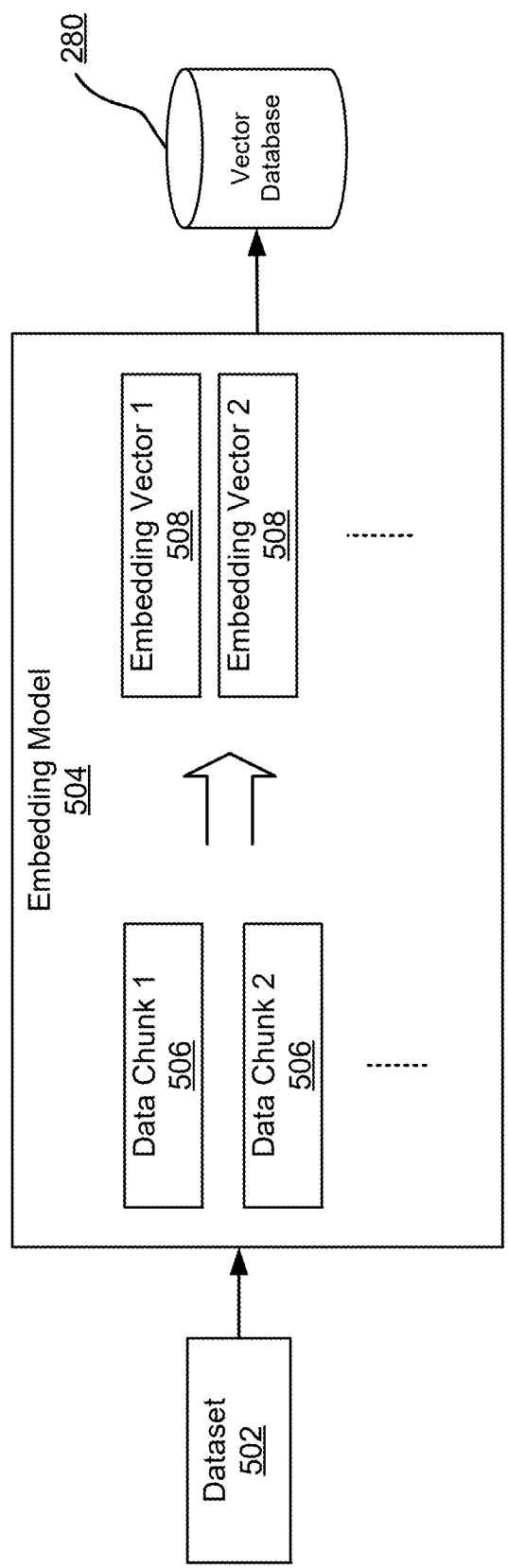
FIG. 5 is a conceptual diagram of generating an embedding vector for representing a dataset in a latent space, according to one or more embodiments.

FIG. 5 is a conceptual diagram of generating an embedding vector for representing a dataset in a latent space, according to one or more embodiments. In various embodiments, the process includes different or additional steps than those described in conjunction with FIG. 5. Further, in some embodiments, the steps of the process may be performed in different orders than the order described in conjunction with FIG. 5. The process described in conjunction with FIG. 5 may be carried out by the data processing service 102 (e.g., the vector search module 350 of the data processing service 102) in various embodiments.

As shown in FIG. 5, the data processing service 102 may access a dataset 502 from a data source, e.g., a data storage.

The vector search module 350 receives the dataset 502 and apply an embedding model 504 to generate one or more embedding vectors 508 for representing the dataset 502. In some embodiments, the vector search module 350 may split the dataset 502 into one or more data chunks 506. In some implementations, the dataset 502 is used as a knowledge base for training large language model(s) (LLMs), and each data chunk may be used as context information and fit into the context window for training the LLMs.

In some embodiments, the vector search module 350 may parse the dataset 502 and extract the metadata that describes the dataset 502. The dataset 502 may include content data such as, text, video, audio, image, and the like. The data chunks 506 may be sentences, paragraphs, pixels, etc., included in the dataset 502. In one example, the vector search module 350 may generate a data chunk 506 for each paragraph in a text document (e.g., a Wikipedia webpage); and in another example, the vector search module 350 may generate a data chunk 506 for each row of data in a data table. The vector search module 350 may apply the embedding model 504 to each of the data chunks 506 and output an embedding vector 508 representing each respective data chunk 506. In some embodiments, a user may determine how to split the dataset 502 and/or select which content is used to generate embedding vectors. The metadata associated with the dataset 502 may include parameters, such as, date, ID, address, etc., and can be used as filters in defining/refining/selecting embedding vectors. In one example, the embedding vectors may be generated based on the content in a specified column of a data table, e.g., date. For instance, a user may select data that is created since 2024 for generating the embedding vectors. In another example, the generated embedding vectors may be selected for training the LLMs based on certain parameters. For instance, a user may select embedding vectors representing domestic sales as context information for training an LLM.

In some embodiments, the vector search module 350 may generate the embedding vectors with a sequence of numbers/terms. In some embodiments, the vector search module 350 may include a trained encoder that encodes (e.g., by applying the embedding model 504) the data chunk into an embedding vector. In some implementations, the embedding model 504 may be an unsupervised learning model. For example, during training, input data may be fed into the encoder and the encoder processes the input data to generate an encoded representation (e.g., an embedding vector in the latent space). In one implementation, a decoder may be used to reconstruct the data chunk based on the generated vector and a loss may be computed by comparing the reconstructed data chunk and the original data chunk. By minimizing the loss, the embedding model 504 may be iteratively trained.

In some embodiments, the vector search module 350 may incrementally update the embedding vectors 508 based on any changes to the corresponding data chunks 506. For example, the vector search module 350 split each row of data in a data table as a separate data chunk and encodes each data chunk to a corresponding embedding vector. When a row of data in the data table changes, e.g., added, deleted, modified, etc., the vector search module 350 may apply the embedding model 504 to the data chunk of this row of data and output an updated embedding vector reflecting the change of the row of data. In some implementations, the vector search module 350 may automatically update the embedding vectors upon detecting an update to the data chunks/datasets. In some implementations, the vector search module 350 may update the embedding vectors periodically. In some implementations, the data processing service 102 may include metadata for recording updates of datasets/data chunks, and the vector search module 350 may use the metadata for updating the embedding vectors. In this way, the embedding vectors may be updated or expanded in accordance with new information, insights, or developments in a particular domain. When the data represented by the embedding vectors are used as context information for training LLMs or generating responses by RAG, the LLMs and RAG can adapt to the changes by incorporating the latest knowledge into their responses.

The metadata associated with each embedding vector may be incrementally updated to reflect changes of the corresponding data chunks. For example, the metadata may include a version number indicating a version of the corresponding data chunk, and the version number may be incremental as changes are made to the corresponding data chunk. In another example, the metadata may include parameters for updating an embedding vector, such as time to expire, time intervals for update, etc. In some embodiments, the parameters of the metadata, such as, date, ID, address, etc., may be incrementally updated, and used as filters in defining/refining/selecting embedding vectors. For instance, a data table includes Column 1 that contains text which is used to generate embedding vectors. The data table includes Column 2 that contains information associated with the text in Column 1, for example, a date when a user latest accessed the corresponding text in Column 1. The information contained Column 2 may be used to generate metadata associated the embedding vectors that represent the text in Column 1. In some cases, the metadata may be incrementally updated. For example, the text in Column 1 does not change, while the date of latest access updates every time when the user accesses the text in Column 1. The metadata may be used as filters when generating the corresponding embedding vectors, and/or as filters when retrieving the generated embedding vectors from the vector database.

In some embodiments, the vector search module 350 may map the embedding vectors to an N-dimensional vector space, e.g., a latent space. In this way, embedding vectors that represent similar data are mapped closer together in the vector space than embedding vectors of dissimilar data. For example, vectors representing apples and oranges are mapped closer to each other than vectors representing apples and boats. The generated embedding vectors 508 may be stored in the vector database 280 which is accessible for querying by the RAG. The corresponding data chunks 506 may be stored in the data store 270 and the metadata that records the relation between the data chunk 506 and the embedding vectors 508 may be stored in the vector database 280.

Figure 6:
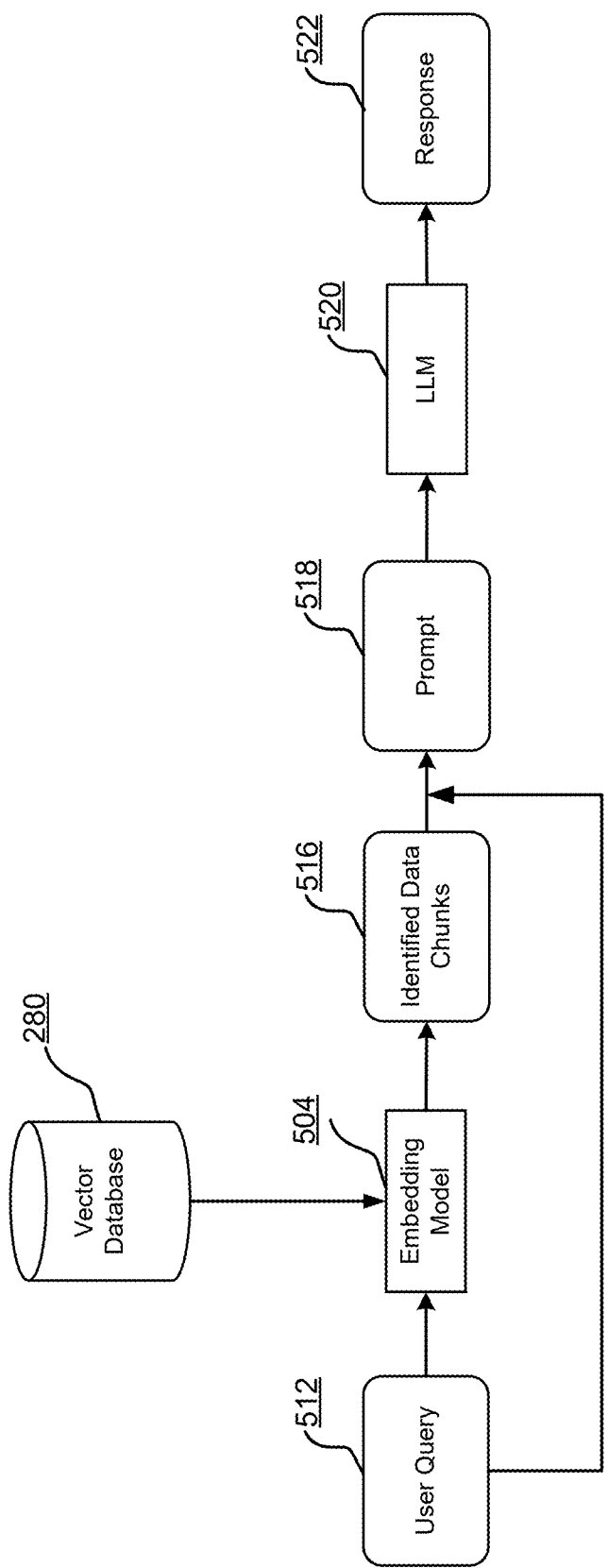
FIG. 6 is a conceptual diagram of retrieval augmented generation using embedding vectors, according to one or more embodiments.

FIG. 6 is a conceptual diagram of retrieval augmented generation using embedding vectors, according to one or more embodiments. In various embodiments, the process includes different or additional steps than those described in conjunction with FIG. 6. Further, in some embodiments, the steps of the process may be performed in different orders than the order described in conjunction with FIG. 6. The process described in conjunction with FIG. 6 may be carried out by the data processing service 102 in various embodiments.

As shown in FIG. 6, the data processing service 102 may receive a query 512 from a user. The query may include textual terms, images, video/audio signals, etc. The data processing service 102 may perform RAG with vector search to provide context-rich external knowledge so that the output response to the user query 512 is more contextually accurate. In order to leverage customized data/external knowledge, the data processing service 102 may apply the embedding model 504 to the user query 512 and generate a user query embedding vector for representing the user query 512 in the latent space. Based on the user query embedding vector, the data processing service 102 may access the vector database 280 and perform a vector search between the user query embedding vector and stored embedding vectors. In some embodiments, the data processing service 102 may perform the vector search by determining a measure of similarity between the user query embedding vector and a stored embedding vector. Similarity between a stored embedding vector and the user query embedding vector may indicate a close relationship between the data chunk/dataset represented by the stored embedding vector and the user query 512 that is represented by the user query embedding vector. The data chunk/dataset represented by the stored embedding vector may be used by RAG to provide contextual information for generating a response to the user query 512.

In some embodiments, the data processing service 102 may compare the user query embedding vector to the stored embedding vectors and determine one or more related embedding vectors based on a measure of similarity between the user query embedding vector and the stored embedding vectors. In some embodiments, the measure of similarity between the user query embedding and a stored embedding vector is associated with a distance between the two embedding vectors in the latent space. In one example, the data processing service 102 may identify a stored embedding vector within a threshold distance of the user query embedding vector in the latent space. The data processing service 102 may identify the one or more related embedding vectors using one or more nearest neighbor methods or approximate nearest neighbor (ANN) methods. For example, the data processing service 102 may uses hierarchical navigable world (HNSW) for the ANN searches. In some embodiments, the data processing service 102 may rank the stored embedding vectors based on the measure of similarities and identify a top N embedding vectors in the rank as the related embedding vectors for the user query embedding vector. In some embodiments, the data processing service 102 determines a measure of similarity between the user query embedding vector and a stored embedding vector based on a dot product or a cosine similarity between the user query embedding vector and a stored embedding vector. In some embodiments, the data processing service 102 uses K-means clustering to generate clusters of the stored embedding vectors based on the user query embedding vector.

Based on the related embedding vectors, the data processing service 102 may access the data store 270 to identify and retrieve the data chunks/datasets 516 that are represented by the related embedding vectors (e.g., one or more datasets, one or more sets of data chunks, etc.). The identified data chunks/datasets 516 may be used as context information that is most relevant to the user query 512 based on the similarity search of the embedding vectors. The network 120 may then generate a prompt 518 using the user query 512 and the identified data chunks/datasets 516 as input to the LLM 520. For example, a user query 512 may be "why would a data engineer want to use DLT?" The data processing service 102 may use vector search and identify related data chunks/datasets 516, such as "Distributed ledger technology (DLT) is a decentralized record-keeping technology," "DLT is a declarative data engineering . . . ," "DLT operates on a network of distributed nodes rather than relying on a central authority . . . ," and the like. The data processing service 102 may generate a prompt, for example, "you are a helpful assistant. Answer the question below using the provided context. The question is "why would a data engineer want to use DLT?" The context is . . . ," followed by the identified data chunks/datasets 516 as context. In some embodiments, the data processing service 102 may provide the generated prompt 518 to a model serving system for execution by the LLM 520. The LLM 520 receives the prompt and output a response 522 to the user query 512.

Figure 7:
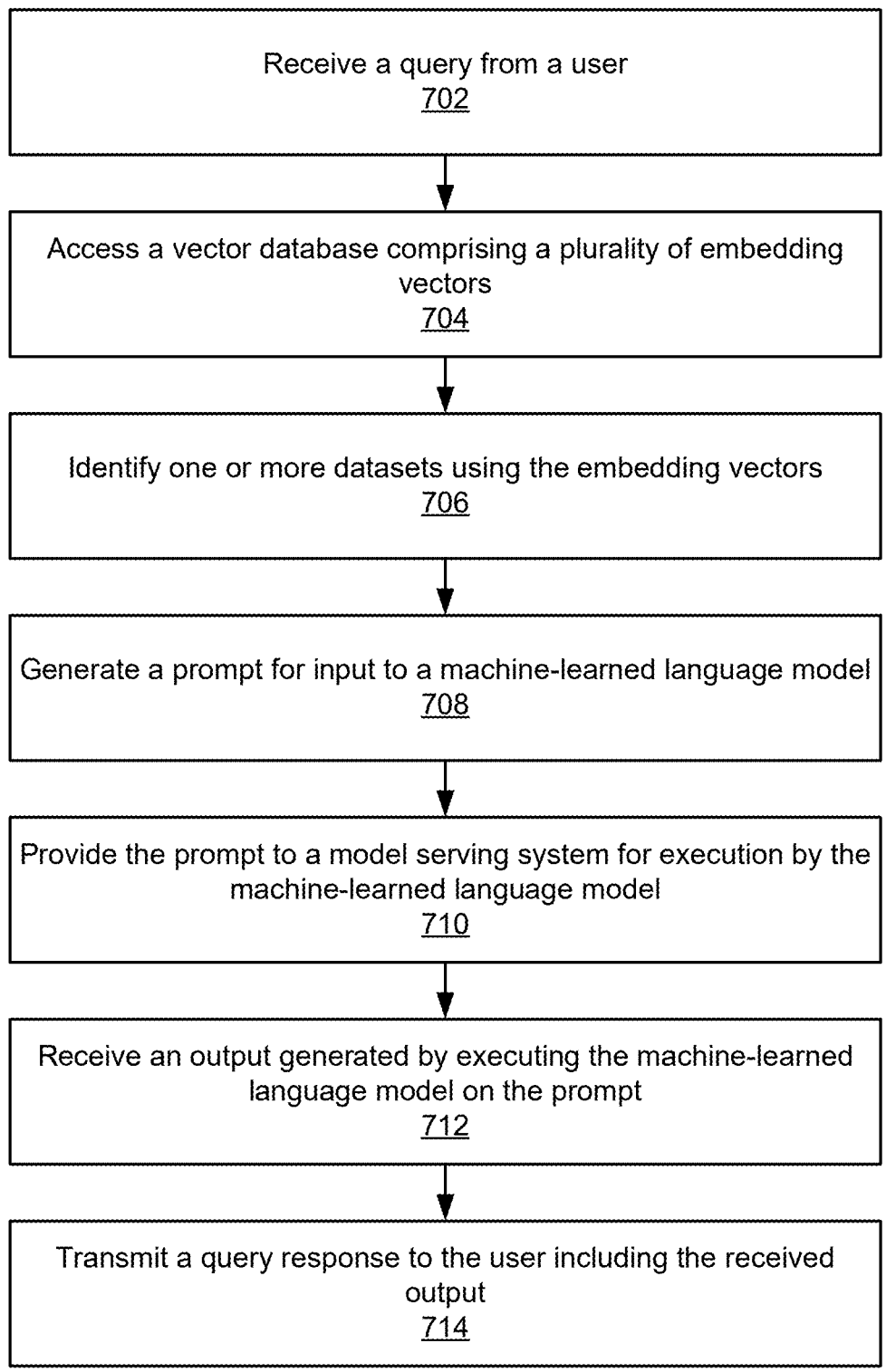
FIG. 7 is a flowchart of a method for performing RAG using vector search, in accordance with an embodiment.

FIG. 7 is a flowchart of a method for performing RAG using vector search, in accordance with an embodiment. The process shown in FIG. 7 may be performed by one or more components (e.g., the control layer 106) of a data processing system/service (e.g., the data processing service 102). Other entities may perform some or all of the steps in FIG. 7. The data processing service 102 as well as the other entities may include some or of the component of the machine (e.g., computer system) described in conjunction with FIG. 10. Embodiments may include different and/or additional steps or performance of the steps may occur in different order.

As shown in FIG. 7, the data processing service 102 may receive 702 a query from a user, via a client device of the user. The data processing service 102 accesses 704 a vector database which includes a plurality of embedding vectors. The embedding vectors may represent datasets in a latent space. Each dataset may include a set of data chunks, and each data chunk may be represented by a set of embedding vectors in the latent space. Each embedding vector is incrementally updated based on a change to the corresponding data chunk. In some embodiments, the data processing service 102 may identify 706 one or more datasets using the embedding vectors based on the user query and generate 708 a prompt for input to a machine-learned language model. The prompt specifies at least the user query, the one or more identified datasets, and a request to generate a response to the user query using the one or more identified datasets as contextual information of the user query. In some embodiments, the data processing service 102 may provide 710 the prompt to a model serving system for execution by the machine-learned language mode and receive 712 an output generated by executing the machine-learned language model on the prompt from the model serving system. The received output may include the requested response to the user query. The data processing service 102 may present a query response to the user which includes the received output. In some embodiments, the data processing service 102 may transmit the query response to the client devices 116 for visual display or audio output. In this way, the data processing service 102 may provide more contextually accurate and informed answers to user queries.

Figure 8:
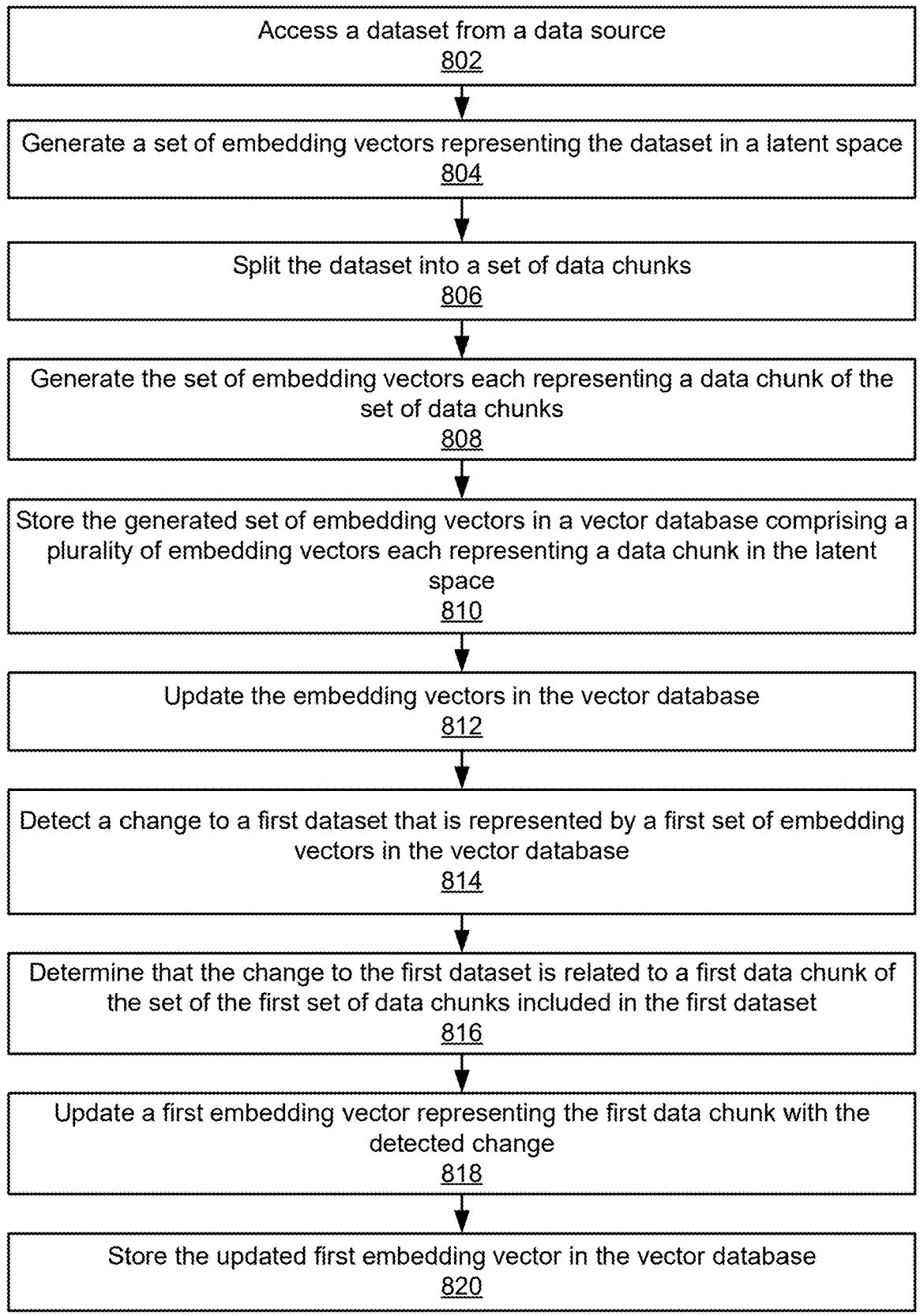
FIG. 8 is a flowchart of a method for updating an embedding vector corresponding to a change in a dataset, in accordance with an embodiment.

FIG. 8 is a flowchart of a method for updating an embedding vector corresponding to a change in a dataset, in accordance with an embodiment. The process shown in FIG. 8 may be performed by one or more components (e.g., the control layer 106) of a data processing system/service (e.g., the data processing service 102). Other entities may perform some or all of the steps in FIG. 8. The data processing service 102 as well as the other entities may include some or of the component of the machine (e.g., computer system) described in conjunction with FIG. 10. Embodiments may include different and/or additional steps or performance of the steps may occur in different order.

As shown in FIG. 8, the data processing service 102 may access 802 a dataset from a data source and generates 804 a set of embedding vectors that represent the dataset in a latent space. In some embodiments, the data processing service 102 may split 806 the dataset into a set of data chunks and generate 808 the set of embedding vectors. Each embedding vector represents a data chunk of the set of data chunks. The data processing service 102 stores 810 the generated set of embedding vectors in a vector database. In some embodiments, the vector database (e.g., vector database 280) may include a plurality of embedding vectors, and each of the plurality of embedding vectors represents a data chunk in the latent space. The data processing service 102 may update 812 the embedding vectors in the vector database incrementally. In some embodiments, the data processing service 102 may detect 814 a change to a first dataset that is represented by a first set of embedding vectors in the vector database, determine 816 that the change to the first dataset is related to a first data chunk of the first set of data chunks included in the first dataset, update 818 a first embedding vector that represents the first data chunk with the detected change, and store 820 the updated first embedding vector in the vector database.

Automatically Generating and Updating Embedding Vectors

Figure 9:
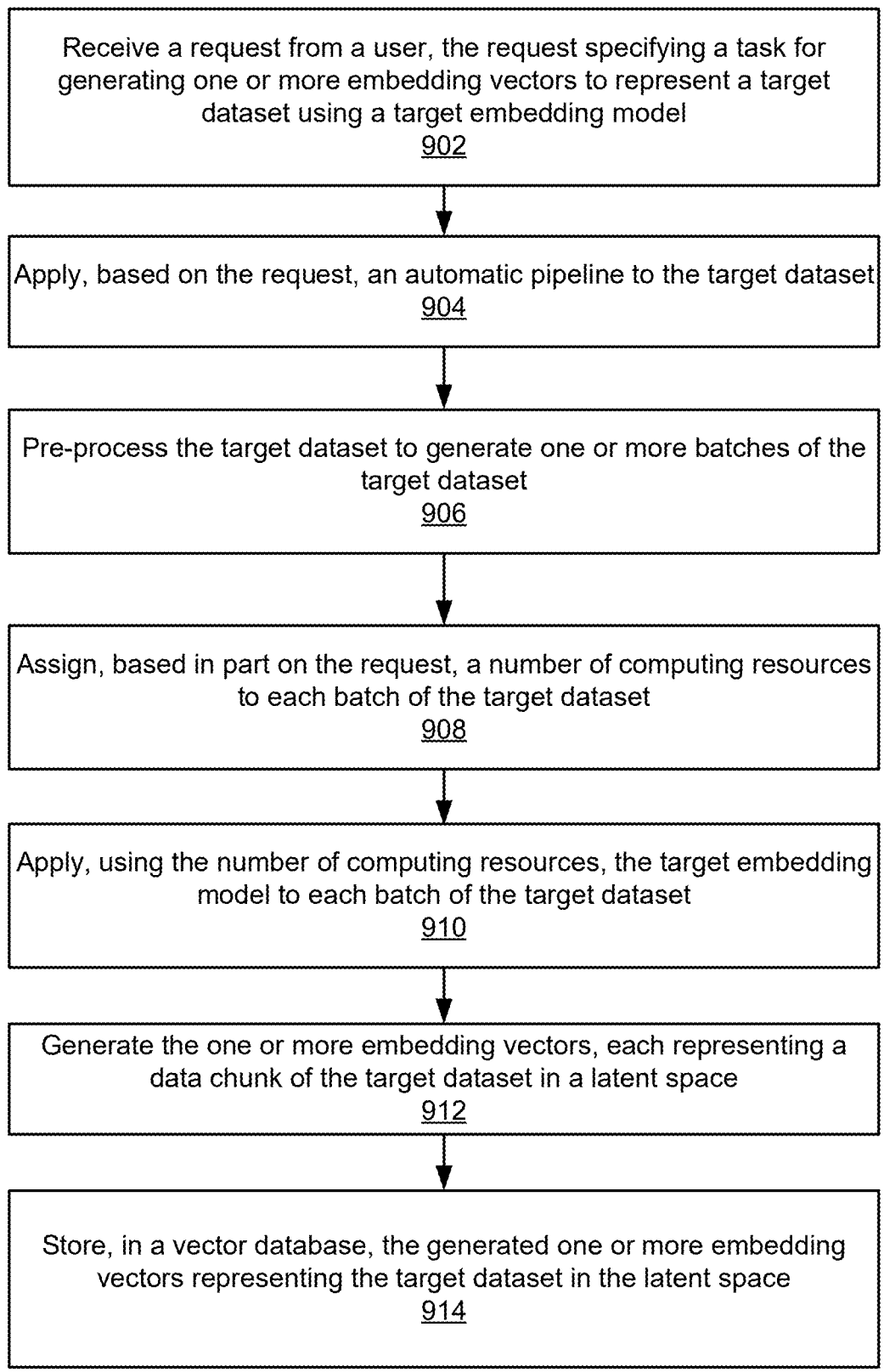
FIG. 9 is a flowchart of a method for automatically generating and updating an embedding vector, in accordance with an embodiment.

FIG. 9 is a flowchart of a method 900 for automatically generating and updating an embedding vector, in accordance with an embodiment. The process shown in FIG. 9 may be performed by one or more components (e.g., the control layer 106) of a data processing system/service (e.g., the data processing service 102). Other entities may perform some or all of the steps in FIG. 9. The data processing service 102 as well as the other entities may include some or of the component of the machine (e.g., computer system) described in conjunction with FIG. 10. Embodiments may include different and/or additional steps or performance of the steps may occur in different order.

The data processing service 102 provides a pipeline for automatically generating and updating embedding vectors that represent datasets from various data sources. The data processing service 102 may receive 902 a request from a user. The request may specify a task for generating one or more embedding vectors to represent a target dataset. In some embodiments, the data processing service 102 may provide a user interface for receiving a user's request. For example, the user may identify a target dataset for indexing, e.g., generating embedding vectors for the target dataset. In some examples, a dataset may be a data table including a plurality of rows, and each row may correspond to a set of data (e.g., a data file) including a plurality of parameters with the corresponding values. The parameters may be, "account," "time," "text content 1," "text content 2," "values," and the like. The user may identify/select a parameter for indexing, e.g., "text content 1," and may select one or more other parameters for generating metadata associated with the generated embedding vectors. Alternatively, the data processing service 102 may select one or more parameters included in the target dataset and the corresponding values for generating metadata. The metadata may be used as filter parameters to refine a user query, embedding retrieval, and the like. Via the user interface, the user may select a target embedding model from a plurality of embedding models that are supported by the data processing service 102. In some examples, the user may identify/select a vector database for storing the generated embedding vectors. The user may also specify parameters, such as expiration time, update mode, etc. for the generated embedding vectors.

Upon receiving the user's request, the data processing service 102 applies 904 an automatic pipeline to the target dataset for automatically indexing/generating embedding vectors. The user request may specify a data source where the target dataset is located, and the data processing service 102 may identify and access the target dataset from the data source based on the user' request.

In some embodiments, the data processing service 102 pre-processes 906 the target dataset to generate one or more batches of the target dataset. For example, the target dataset may include a plurality of data tables, and the data processing service 102 may batch the data table into one or more batches so that the automatic pipeline may index the target dataset batch per batch. In some implementations, the pre-processing may include sanitizing the target dataset. For example, a data table may include empty rows, duplicated rows, etc. The data processing service 102 may sanitize the target dataset by removing the empty rows or duplicated rows from the target dataset. The data processing service 102 may set conditions for sanitizing the target dataset, such as expiration date, data size, etc. In some implementations, the data processing service 102 may split data included in a batch of the target dataset into a set of data chunk, and each data chunk corresponds to a piece of information included in the target dataset. In an example of a data table, a data chunk may correspond to a row of data; in an example of text article, a data chunk may correspond to a paragraph of text, etc. In some examples, a data chunk may be further split into smaller data chunks. For example, a long paragraph of text may be further split into a plurality of smaller data chunks, each smaller data chunk corresponds to a sentence.

The data processing service 102 assigns 908 a number of computing resources to each batch of the target dataset for generating the target dataset. The data processing service 102 may determine the number of computing resources based on the size of data in the batch of the target dataset, the embedding model selected by the user, the vector database for storing the generated embedding vector, etc. In some embodiments, the data processing service 102 may assign a pre-determined (e.g., a default) number of computing resources to a batch of the target dataset and monitors error characteristic during the indexing process (e.g., generating the one or more embedding vectors.) In some implementations, the data processing service 102 may detect an error rate, error frequency, etc. during the indexing process, and determine that the detected error characteristic is related to the assigned computing resources. In one example, a batch of target dataset includes a data table with 35 million rows of data. The data processing service 102 may initially assign a pre-determined number of computing resources that are capable of handling a data of 20 million rows of data. In this example, during the indexing process, the data processing service 102 may detect an error indicating that the indexing process is too slow. The data processing service 102 may automatically adjust the number of computing resources to the batch of target dataset to reduce the error. The data processing service 102 may automatically scale up or down the number of computing resources based on the error characteristics detected during the indexing process.

The data processing service 102 may apply 910, using the number of computing resources, the target embedding model to each batch of the target dataset to generate the corresponding embedding vectors. The data processing service 102 generates 912 the one or more embedding vectors and stores 914 the generated embedding vectors in a vector database. Each embedding vector may represent a data chunk of the target dataset in a latent space. Each embedding vector may be incrementally updated based on an update to the corresponding data chunk. For example, the data processing service 102 may detect a change to a dataset that is represented by a plurality of embedding vectors that are stored in a vector database. The data processing service 102 may monitor/detect a change to the dataset and identifies that the change is related to a data chunk in the dataset. The data processing service 102 may identifies an embedding vector that represents the data chunk from the vector database and updates the identified embedding vector to reflect the detected change to the corresponding data chunk. Once updated, the data processing service 102 stores the updated embedding vector in the vector database for query, retraval, etc.

Figure 10:
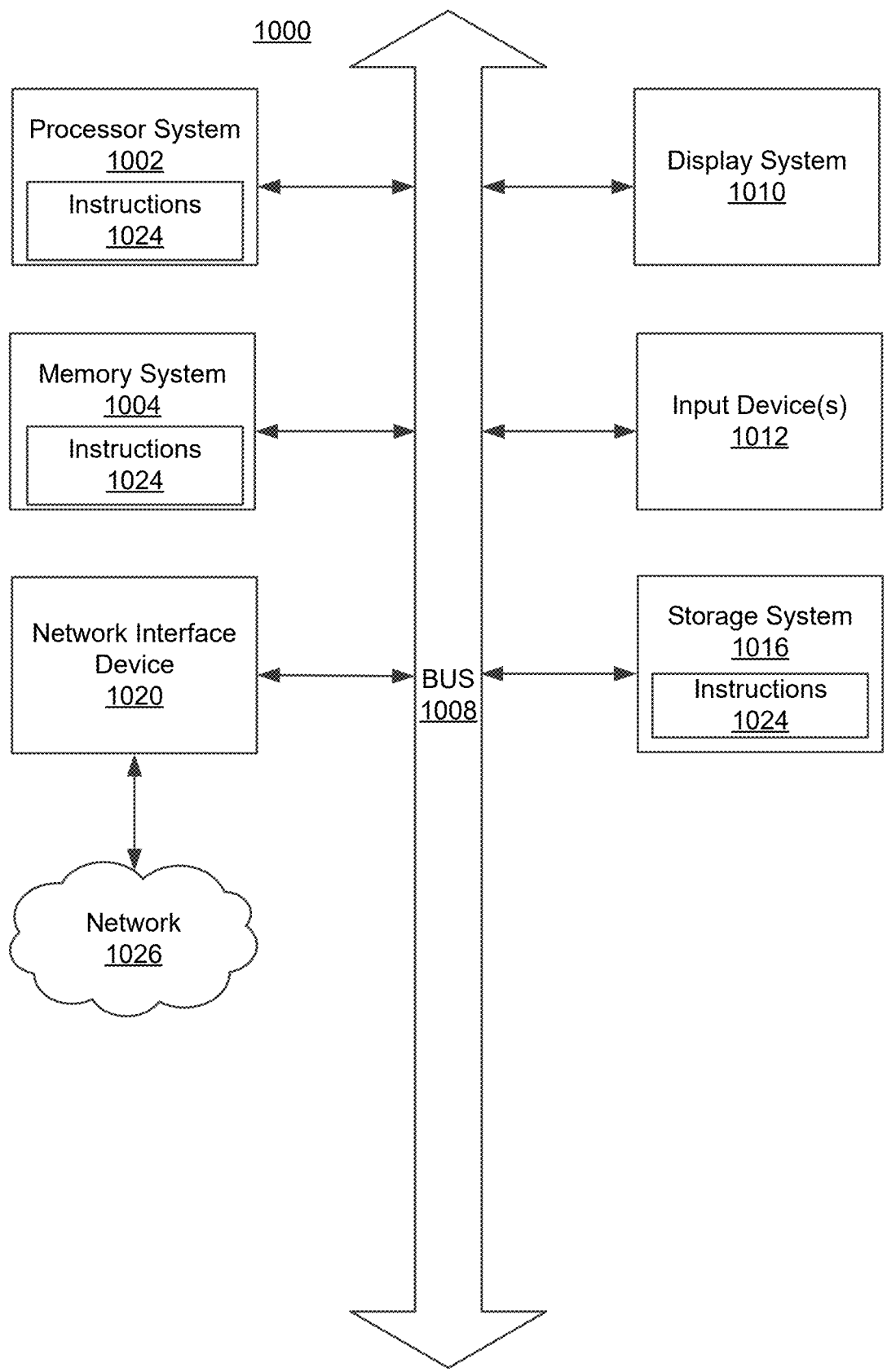
FIG. 10 is a block diagram illustrating an example machine to read and execute computer readable instructions, in accordance with an embodiment.

Turning now to FIG. 10, illustrated is an example machine to read and execute computer readable instructions, in accordance with an embodiment. Specifically, FIG. 10 shows a diagrammatic representation of the data processing service 102 (and/or data processing system) in the example form of a computer system 1000. The computer system 1000 is structured and configured to operate through one or more other systems (or subsystems) as described herein. The computer system 1000 can be used to execute instructions 1024 (e.g., program code or software) for causing the machine (or some or all of the components thereof) to perform any one or more of the methodologies (or processes) described herein. In executing the instructions, the computer system 1000 operates in a specific manner as per the functionality described. The computer system 1000 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 1000 may be a server computer, a client computer, a personal computer (PC), a tablet PC, a smartphone, an internet of things (IoT) appliance, a network router, switch or bridge, or other machine capable of executing instructions 1024 (sequential or otherwise) that enable actions as set forth by the instructions 1024. Further, while only a single machine is illustrated, the term "machine" shall also be taken to include any collection of machines that individually or jointly execute instructions 1024 to perform any one or more of the methodologies discussed herein.

The example computer system 1000 includes a processing system 1002. The processor system 1002 includes one or more processors. The processor system 1002 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 1002 executes an operating system for the computing system 1000. The computer system 1000 also includes a memory system 1004. The memory system 1004 may include or more memories (e.g., dynamic random access memory (RAM), static RAM, cache memory). The computer system 1000 may include a storage system 1016 that includes one or more machine readable storage devices (e.g., magnetic disk drive, optical disk drive, solid state memory disk drive).

The storage unit 1016 stores instructions 1024 (e.g., software) embodying any one or more of the methodologies or functions described herein. For example, the instructions 724 may include instructions for implementing the functionalities of the transaction module 330 and/or the query processing module 335. The instructions 1024 may also reside, completely or at least partially, within the memory system 1004 or within the processing system 1002 (e.g., within a processor cache memory) during execution thereof by the computer system 1000, the main memory 1004 and the processor system 1002 also constituting machine-readable media. The instructions 1024 may be transmitted or received over a network 1026, such as the network 1026, via the network interface device 1020.

The storage system 1016 should be taken to include a single medium or multiple media (e.g., a centralized or distributed database, or associated caches and servers communicatively coupled through the network interface system 1020) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 1000 can include a display system 1010. The display system 1010 may driver firmware (or code) to enable rendering on one or more visual devices, e.g., drive a plasma display panel (PDP), a liquid crystal display (LCD), or a projector. The computer system 1000 also may include one or more input/output systems 1012. The input/output (IO) systems 1012 may include input devices (e.g., a keyboard, mouse (or trackpad), a pen (or stylus), microphone) or output devices (e.g., a speaker). The computer system 1000 also may include a network interface system 1020. The network interface system 1020 may include one or more network devices that are configured to communicate with an external network 1026. The external network 1026 may be a wired (e.g., ethernet) or wireless (e.g., WiFi, BLUETOOTH, near field communication (NFC).

The processor system 1002, the memory system 1004, the storage system 1016, the display system 1010, the IO systems 1012, and the network interface system 1020 are communicatively coupled via a computing bus 1008.

ADDITIONAL CONSIDERATIONS

The disclosed configurations provide a method (and/or a computer-readable medium or system) of retrieval augmented generation (RAG) using vector search. RAG with vector search enhances the capabilities of LLMs by providing context-rich external knowledge. Vector search allows LLMs to retrieve relevant external knowledge by using vectors, enriching the context in which the model generates responses. This helps in providing more contextually accurate and informed answers. The embedding vectors are incrementally updated based on the changes to the datasets, which further improves the model's ability to stay relevant and up-to-date by adapting to evolving data, trends, or external knowledge, as well as the model's understanding, responsiveness, and adaptability, ultimately leading to more accurate and contextually relevant generation of responses. Additionally, the disclosed configurations provide an automatic pipeline for generating embedding vectors. The configuration may monitor the indexing process, and automatically adjust the number of computing resources to the batch of target dataset. The configuration may automatically scale up or down the number of computing resources based on the error characteristics detected during the indexing process.

The foregoing description of the embodiments of the disclosed subject matter have been presented for the purpose of illustration; it is not intended to be exhaustive or to limit the disclosed embodiments to the precise forms disclosed.

Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the disclosed subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method, comprising:
   accessing a dataset from a data source;
   generating a set of embedding vectors representing the dataset in a latent space, wherein generating the set of embedding vectors comprises:
      splitting the dataset into a set of data chunks;
      indexing each data chunk of the set of data chunks with an embedding vector of the set of embedding vectors; and
      generating, for each data chunk of the set of data chunks, metadata associated with a corresponding embedding vector, the metadata comprising version information indicative of the data chunk;
   storing the generated set of embedding vectors in a vector database; and
   updating the embedding vectors in the vector database, the updating further comprising:
      detecting a change to the dataset;
      determining, based on change information recorded in a transaction log for the dataset, that the change to the dataset is related to a first data chunk of the set of data chunks;
      accessing the metadata corresponding to the first data chunk;
      determining, based on a comparison of the version information in the metadata corresponding to the first data chunk with version information for the first data chunk indicated by the change information in the transaction log, that a first embedding vector representing the first data chunk requires an update;
      updating the first embedding vector representing the first data chunk based on the change information; and
      replacing the first embedding vector stored in the vector database with the updated first embedding vector.

2. The method of claim 1, wherein the metadata for each data chunk represents one or more parameters of the data chunk.

3. The method of claim 1, further comprising:
   updating the metadata corresponding to the first data chunk based on the change information.

4. The method of claim 1, comprising:
   receiving, from a client device, a query;
   identifying, based on the query, one or more datasets using one or more sets of embedding vectors stored in the vector database;
   generating a prompt for input to a machine-learned language model, the prompt specifying at least the query, the one or more identified datasets, and a request to generate a response to the query using the one or more identified datasets as contextual information of the query;
   providing the prompt to a model serving system for execution by the machine-learned language model;
   receiving, from the model serving system, an output generated by executing the machine-learned language model on the prompt, the output comprising the requested response to the query; and
   providing for display a query response including the received output.

5. The method of claim 4, wherein identifying, based on the query, the one or more datasets further comprises:
   applying an embedding model to the query; and
   generating a user query embedding vector that represents the query in the latent space.

6. The method of claim 1, further comprising:
   periodically updating the set of embedding vectors; and
   storing the updated embedding vectors in the vector database.

7. The method of claim 1, wherein the dataset comprises information in a format of text, audio, video, or image.

8. A non-transitory computer readable storage medium comprising stored program code comprising instructions that when executed by one or more processors of one or more computing devices cause the one or more computing devices to:
  access a dataset from a data source;
  generate a set of embedding vectors representing the dataset in a latent space, the instruction to generate the set of embedding vectors further comprising instructions to:
    split the dataset into a set of data chunks;
    index each data chunk of the set of data chunks with an embedding vector of the set of embedding vectors; and
    generate, for each data chunk of the set of data chunks, metadata associated with a corresponding embedding vector, the metadata comprising version information indicative of the data chunk;
  store the generated set of embedding vectors in a vector database; and
  update the embedding vectors in the vector database, the instruction to update further comprising instructions to:
    detect a change to the dataset;
    determine, based on change information recorded in a transaction log for the dataset, that the change to the dataset is related to a first data chunk of the set of data chunks;
    access the metadata corresponding to the first data chunk;
    determine, based on a comparison of the version information in the metadata corresponding to the first data chunk with version information for the first data chunk indicated by the change information in the transaction log, that a first embedding vector representing the first data chunk requires an update;
    update the first embedding vector representing the first data chunk based on the change information; and
    replace the first embedding vector stored in the vector database with the updated first embedding vector.

9. The non-transitory computer readable storage medium of claim 8, wherein the metadata for each data chunk represents one or more parameters of the data chunk.

10. The non-transitory computer readable storage medium of claim 8, wherein the instructions further cause the one or more computing devices to:
  update the metadata corresponding to the first data chunk based on the change information.

11. The non-transitory computer readable storage medium of claim 8, wherein the instructions further cause the one or more computing devices to:
  receive, from a client device, a query;
  identify, based on the query, one or more datasets using one or more sets of embedding vectors stored in the vector database;
  generate a prompt for input to a machine-learned language model, the prompt specifying at least the query, the one or more identified datasets, and a request to generate a response to the query using the one or more identified datasets as contextual information of the query;
  provide the prompt to a model serving system for execution by the machine-learned language model;
  receive, from the model serving system, an output generated through execution of the machine-learned language model on the prompt, the output comprising the requested response to the query; and
  provide for display a query response including the received output.

12. The non-transitory computer readable storage medium of claim 11, wherein the instructions to identify based on the query, the one or more datasets, cause the one or more computing devices to:
  apply an embedding model to the query; and
  generate a user query embedding vector that represents the query in the latent space.

13. The non-transitory computer readable storage medium of claim 8, wherein the instructions further cause the one or more computing devices to:
  periodically update the set of embedding vectors; and
  store the updated embedding vectors in the vector database.

14. The non-transitory computer readable storage medium of claim 8,
  wherein the dataset comprises information in a format of text, audio, video, or image.

15. A system comprising:
  one or more computer processors; and
  one or more computer-readable mediums storing instructions that, when executed by the one or more computer processors, cause the system to:
    access a dataset from a data source;
    generate a set of embedding vectors representing the dataset in a latent space, the instruction to generate the set of embedding vectors further comprising instructions to:
      split the dataset into a set of data chunks;
      index each data chunk of the set of data chunks with an embedding vector of the set of embedding vectors; and
      generate, for each data chunk of the set of data chunks, metadata associated with a corresponding embedding vector, the metadata comprising version information indicative of the data chunk;
    store the generated set of embedding vectors in a vector database; and
    update the embedding vectors in the vector database, the instruction to update further comprising instructions to:
      detect a change to the dataset;
      determine, based on change information recorded in a transaction log for the dataset, that the change to the dataset is related to a first data chunk of the set of data chunks;
      access the metadata corresponding to the first data chunk;
      determine, based on a comparison of the version information in the metadata corresponding to the first data chunk with version information for the first data chunk indicated by the change information in the transaction log, that a first embedding vector representing the first data chunk requires an update;
      update the first embedding vector representing the first data chunk based on the change information; and
      replace the first embedding vector stored in the vector database with the updated first embedding vector.

16. The system of claim 15, wherein the metadata for each data chunk represents one or more parameters of the data chunk.

17. The system of claim 15, wherein the instructions further cause the system to:
  update the metadata corresponding to the first data chunk based on the change information.

18. The system of claim 15, wherein the instructions further cause the system to:
- receive, from a client device, a query;
- identify, based on the query, one or more datasets using one or more sets of embedding vectors stored in the vector database;
- generate a prompt for input to a machine-learned language model, the prompt specifying at least the query, the one or more identified datasets, and a request to generate a response to the query using the one or more identified datasets as contextual information of the query;
- provide the prompt to a model serving system for execution by the machine-learned language model;
- receive, from the model serving system, an output generated through execution of the machine-learned language model on the prompt, the output comprising the requested response to the query; and
- provide for display a query response including the received output.

19. The system of claim 18, wherein the instructions to identify the one or more datasets further cause the system to:
- apply an embedding model to the query; and
- generate a user query embedding vector that represents the query in the latent space.

20. The system of claim 15, wherein the instructions further cause the system to:
- periodically update the set of embedding vectors; and
- store the updated embedding vectors in the vector database.

* * * * *